(12) United States Patent
Singleton

(10) Patent No.: US 7,918,064 B2
(45) Date of Patent: Apr. 5, 2011

(54) STRUCTURAL COUPLINGS

(76) Inventor: Mark James Singleton, Malvern (GB)

( * ) Notice: Subject to any disclaimer, the term of this patent is extended or adjusted under 35 U.S.C. 154(b) by 943 days.

(21) Appl. No.: 10/570,820

(22) PCT Filed: Sep. 8, 2004

(86) PCT No.: PCT/GB2004/003832
§ 371 (c)(1),
(2), (4) Date: Oct. 11, 2006

(87) PCT Pub. No.: WO2005/024251
PCT Pub. Date: Mar. 17, 2005

(65) Prior Publication Data
US 2007/0094994 A1  May 3, 2007

(30) Foreign Application Priority Data
Sep. 9, 2003 (GB) .................................. 0321005.1

(51) Int. Cl.
*E04D 1/36* (2006.01)
(52) U.S. Cl. ................. 52/464; 52/463; 52/461
(58) Field of Classification Search .............. 52/582.1, 52/584.1, 461, 463, 464, 466, 468, 471; 403/329, 403/397
See application file for complete search history.

(56) References Cited

U.S. PATENT DOCUMENTS

| | | | | | |
|---|---|---|---|---|---|
| 697,746 | A | * | 4/1902 | Pierson | 52/417 |
| 697,747 | A | * | 4/1902 | Peirson | 52/417 |
| 781,538 | A | * | 1/1905 | Lyster | 52/461 |
| 850,275 | A | * | 4/1907 | Staples | 52/584.1 |
| 1,219,177 | A | * | 3/1917 | Silverman | 52/395 |
| 2,803,321 | A | * | 8/1957 | Fox-Williams | 52/464 |
| 2,822,898 | A | * | 2/1958 | Richards | 52/471 |
| 2,855,871 | A | * | 10/1958 | Huntington | 52/461 |
| 2,907,287 | A | * | 10/1959 | Trostle | 52/463 |
| 3,225,502 | A | * | 12/1965 | Hallauer | 52/461 |
| 3,332,190 | A | * | 7/1967 | Ekstrom | 52/464 |
| 3,363,381 | A | * | 1/1968 | Forrest | 52/464 |
| 3,381,436 | A | * | 5/1968 | Elliott et al. | 52/468 |
| 3,594,028 | A | * | 7/1971 | Scott | 52/465 |
| 3,667,183 | A | * | 6/1972 | Heirich | 52/506.06 |
| 3,958,388 | A | * | 5/1976 | Hawes | 52/584.1 |
| 4,038,796 | A | * | 8/1977 | Eckel | 52/220.7 |

(Continued)

FOREIGN PATENT DOCUMENTS

DE  94 01 798 U  5/1995

(Continued)

*Primary Examiner* — Brian E Glessner
*Assistant Examiner* — James J Buckle, Jr.
(74) *Attorney, Agent, or Firm* — Birch, Stewart, Kolasch & Birch LLP

(57) ABSTRACT

The present invention relates to structural couplings for forming of a variety of structures such as floor and wall panels for buildings and internal structures such as hand rails. The structural coupling comprises a structural component or components (1) provided with coupling leg formations (2) and locking flanges (F) and a channel section (8) which interconnect one with the other by means of a snap fit engagement (12) of the leg formations (2) of the structural component (1) with the channel section (8). This has considerable advantages over the prior art where nuts and bolts were needed to fasten the components together. The use of a common channel section which can be engaged by snap fit action provides an elegant and non-limited method of joining structural components together rather than in a direct fashion as with prior systems.

8 Claims, 5 Drawing Sheets

U.S. PATENT DOCUMENTS

| | | | | |
|---|---|---|---|---|
| 4,106,255 | A | * | 8/1978 | Eckel .......................... 52/586.1 |
| 4,569,175 | A | * | 2/1986 | Abciuk ...................... 52/506.07 |
| 4,583,339 | A | * | 4/1986 | Cotter ............................ 52/466 |
| 4,603,528 | A | * | 8/1986 | Sigerist .......................... 52/464 |
| 4,627,469 | A | * | 12/1986 | Buard ............................ 138/92 |
| 4,829,740 | A | * | 5/1989 | Hutchison ................... 52/475.1 |
| 4,833,858 | A | * | 5/1989 | Hutchison ................... 52/475.1 |
| 4,930,279 | A | * | 6/1990 | Bart et al. ....................... 52/466 |
| 5,370,344 | A | * | 12/1994 | Nadherny ....................... 248/56 |
| 5,511,353 | A | * | 4/1996 | Jones ............................. 52/536 |
| 5,735,096 | A | * | 4/1998 | Krass ............................. 52/464 |
| 5,743,498 | A | * | 4/1998 | Kampf ......................... 248/74.4 |
| 5,857,799 | A | * | 1/1999 | Blake, III ...................... 403/292 |
| 6,092,346 | A | * | 7/2000 | Even et al. ...................... 52/579 |
| 6,408,589 | B1 | | 6/2002 | Bousquet |
| 6,453,632 | B1 | * | 9/2002 | Huang ......................... 52/403.1 |
| 6,536,175 | B2 | * | 3/2003 | Conterno .................... 52/489.1 |
| 7,562,504 | B2 | * | 7/2009 | Herbst et al. ................... 52/461 |
| 2002/0032997 | A1 | * | 3/2002 | Shreiner ......................... 52/393 |

FOREIGN PATENT DOCUMENTS

| | | | |
|---|---|---|---|
| JP | 02173408 A | * | 7/1990 |
| WO | WO-00/22252 A | | 4/2000 |

* cited by examiner

STRUCTURAL COUPLINGS

FIELD OF THE INVENTION

The present invention relates to structural couplings for forming a variety of structures such as floor and wall panels for buildings and internal structures such as hand rails.

BACKGROUND OF INVENTION

Unistrut channels for forming a variety of structures are well known.

The Unistrut system employs channel sections made exclusively of steel which vary only in overall profile height and the thickness of the steel used. Each Unistrut channel in practice is available alone or welded to one or more pieces of the same section in various arrangements or to thin continuous steel plate to present a varied range of steel structural profiles to which blind connections can be made using Unistrut nuts and screws.

A range of flat and folded, pre-drilled steel plates are available with the Unistrut system to connect channels together in different ways to create frame structures.

Fittings are also available so that channels can provide support for cable trays or pipes.

Unistrut channels are generally left open between connections although a flat faced closure strip is available. This is the only continuous section that is available to Unistrut channels but is not itself channel shaped and is not used to make connections.

Unistrut channels are also used to create truss frames and space frames to which blind attachments can be made.

While the Unistrut system is used to make frames and not continuous surfaces it can be used to provide support for them.

Unistrut nuts only fit a range of Unistrut channels which are available in appropriate shapes and are too rigid to be made to enclose another profile.

A problem with the Unistrut system is its limited use in terms of the structures that can be produced in practice for the reasons explained above.

SUMMARY OF THE INVENTION

An object of the invention is to realise the possibility of avoiding the need to connect similar profiles to each other to make frames as in the Unistrut system, but rather to connect the profiles together through the intermediary of a common channel profile. In this way two panels for example can be joined, not directly to each other but to a separate profile to which the common channel connects thereby to facilitate the construction, for example, of a continuous wall with reinforcing struts at every join and to which blind fixings can be made.

According to one aspect of the invention there is provided a structural coupling comprising a structural component or components provided with coupling leg formations and locking flanges on at least a pair of opposing ones of said leg formations in assembly, a connecting channel section the sides of which are adapted respectively to engage said pair of leg formations and means for providing snap fit engagement of the leg formations of the structural component with the channel section to secure the component or components together.

Advantageously the leg formations are provided with coupling slots such that when two leg formations on the structural component or components are in opposed relationship the sides of the channel section slot into the respective coupling slots.

The coupling in accordance with the invention may be used to form a floor or roof of a structure. In this case preferably the structural components are in the form of rigid panels assembled in side by side relationship with a leg formation along one edge of a panel in opposed relation to a leg formation on the adjoining panel. The coupling slots preferably are so formed that with the sides of the channel section engaged therein the base of the channel section and the rigid panels lie in the same plane.

According to another aspect of the invention there is provided a structural coupling comprising a structural component or components provided with coupling leg formations and locking flanges on at least a pair of opposing ones of said leg formations in assembly, a connecting channel section the sides of which are adapted respectively to engage said pair of leg formations, a locking formation on the channel section, and a clip fixing for snap fit engagement with said locking formation and said locking flanges to secure the component or components together.

Other features and advantages of the present invention will become apparent from the following description of a preferred embodiment of the invention taken with reference to the accompanying drawings.

BRIEF DESCRIPTION OF THE DRAWINGS

For a better understanding of the invention and to show how the same may be carried into effect, reference will now be made by way of example, to the accompanying drawings in which.

PREFERRED EMBODIMENTS OF THE INVENTION

Figure 1:
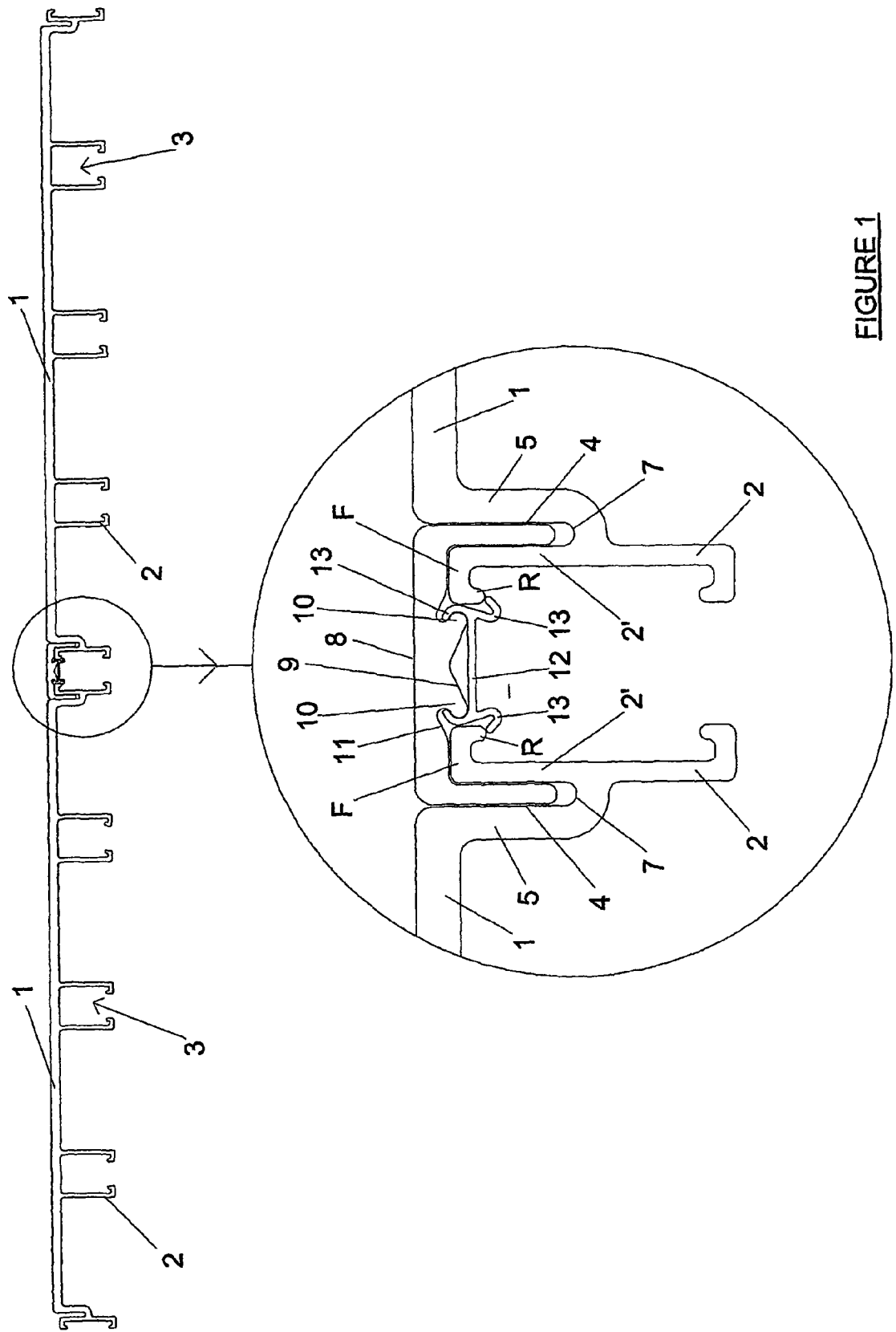
FIG. 1 is a cross sectional view of a structural coupling in accordance with the invention in the form of a floor panel.

FIG. 1 shows the invention used to connect together two floor panels 1 which may be of varying width or length to suit requirements.

The panels 1 have rigidising pairs of opposed L-shaped legs 2 spaced at intervals along the underside surface of the panel 1 to form open box structures 3.

The opposed edges of the panels 1 are provided with coupling slots 4.

The coupling slots 4 are formed from a short vertically depending wall portion 5 of the panels 1 and the upper vertical extent 2' of an end leg 2 of the panels 1 which is spaced from the short wall portion 5 by a short horizontal wall section 7 which forms the base of the coupling slots 4. The vertical extent 2' of the end leg 2 is provided with an inturned looking flange F provided with a locking rib formation R.

The downward vertical extent of the end leg 2 from the short horizontal wall section 7 forming the base of each of the coupling slots 4, is equal to the vertical extent of the legs 2, while the upward extent 2' is less than that of the short vertically extending wall portions 5 by a distance equal to the thickness of the floor panels 1.

The walls of a channel section 8 respectively engage the coupling slots 4 of two opposing floor panels 1 as shown, the thickness of the base of the channel section 8 being equal to the difference between the length of the walls (2',5) of the coupling slots 4 thereby to form a continuous flat surface across the join between the two floor panels 1.

The base of the channel section 8 is provided with an embossment 9 providing two projecting formations 10 to either side of the centre line of the embossment 9, the projections 10 defining at their rearward extent, channel recesses 11 in the base of the channel section 8 as shown.

A snap fit fixing 12 formed by extrusion, is then used to anchor the channel section 8 in the coupling slots 4, the snap fit fixing 12 having flexible barbs 13 which engage the channel recesses 11 and the rib formation R as shown to hold the channel section 8 in a vice like grip in the coupling slots 4.

Figure 2:
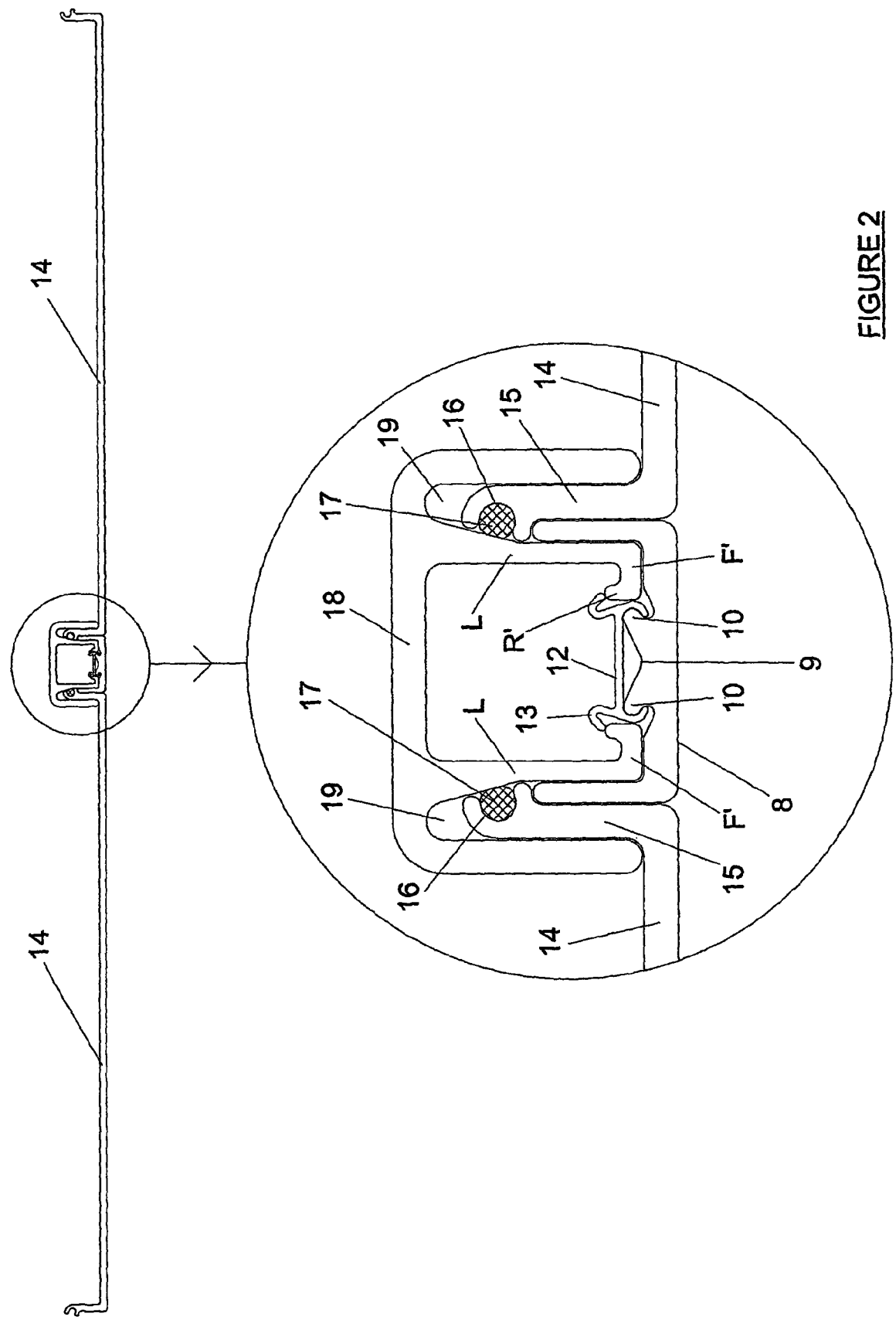
FIG. 2 is a cross sectional view of a further structural coupling employing the invention to form a wall panel.

The wall panel as shown in FIG. 2 uses the channel section 8 in the same manner as described with reference to FIG. 1.

In FIG. 2 the channel section 8 is used to complete the assembly of a wall strut for a wall panel.

The wall panel is formed of a series of rigid flat panels 14 having side edge leg formations 15, the ends of which have circular recesses 16 for accommodating sealing gaskets 17 as shown.

The wall strut is in the form of a doubled wall channel 18, the space between the double walls forming coupling slots 19.

The inner wall leg formations L of the double walled channel 18 are provided with inturned locking flanges P defining locking ribs R'.

The leg formations 15 on the side edges of the wall panels 14 together with the side walls of the channel section 8 are accommodated in tight fit relationship in the coupling slots 19 of the channel shaped wall strut 18, with the sealing gasket 17 in pressure contact with the inner wall leg formation L of the channel 18.

As with the FIG. 2 embodiment the snap fit fixing 12 is then used to anchor the channel section 8 in the coupling slots 19 by engagement of the flexible barbs 13 which engage the channel recesses 11 and the rib formation R' to hold the channel section 8 together with the leg formations L on the edges of the wall panels in vice like grip in the coupling slots 19.

As shown the design is such that in assembly the outer base wall of the channel section 8 lies in the same plane as the outer surface of the wall panel to provide a continuous finish to the assembly.

Figure 3:
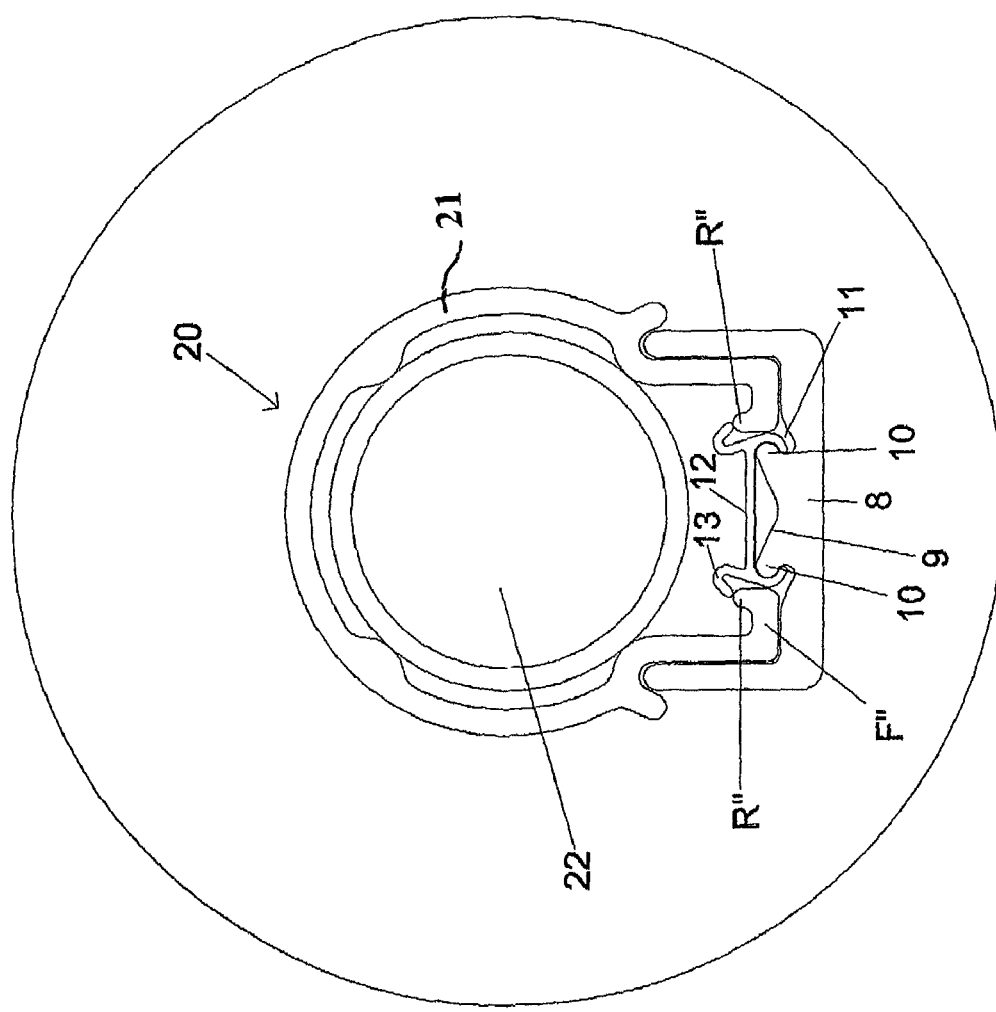
FIG. 3 illustrates the use of the invention as a structural coupling in the form of a handrail.

The invention may also be used to construct a rail such as a hand rail as shown in FIG. 3.

The hand rail 20 is essentially a U profile 21 that is closed by the common channel section 8 in accordance with the invention, around an inner tubular core 22 as shown. This allows the fabricator to make joins in the hand rail or connect to a suitable corner section which can be fixed at any angle.

To effect closure of the rail 20 the ends of the U profile 21 thereof are provided with leg formations E similar to the leg formations 2' and L of the FIG. 1 and 2 embodiments and provided with inturned locking flanges F" and locking ribs R".

The internal size of the channel section 8 is such that when the leg formations E are located in the channel section 8 as shown, they are forced together by the walls of the channel section 8 to close the profile 21 around the core 22.

The coupling thus formed is securely held together by means of the clip fixing 12 and inter engaging barbs 13 respectively with the ribs R" and projections 10 as with the FIGS. 1 and 2 embodiments.

To each of the FIGS. 1 to 3 embodiments blind fixings can readily be made as illustrated clearly in FIG. 4 described with reference to the wall strut assembly of FIG. 2.

The blind fixing comprises a locking nut 23 which bridges or spans the locking ribs R' to occupy the space between the walls of the channel section 8. The nut 23 is engaged by a threaded bolt 24 passing through the base of the section 8, the nut 23 having grooves 25 which receive the ribs R' when the bolt 24 is fully engaged. The tension spring 25 is employed to facilitate easy assembly of the nut 23.

Figure 4:
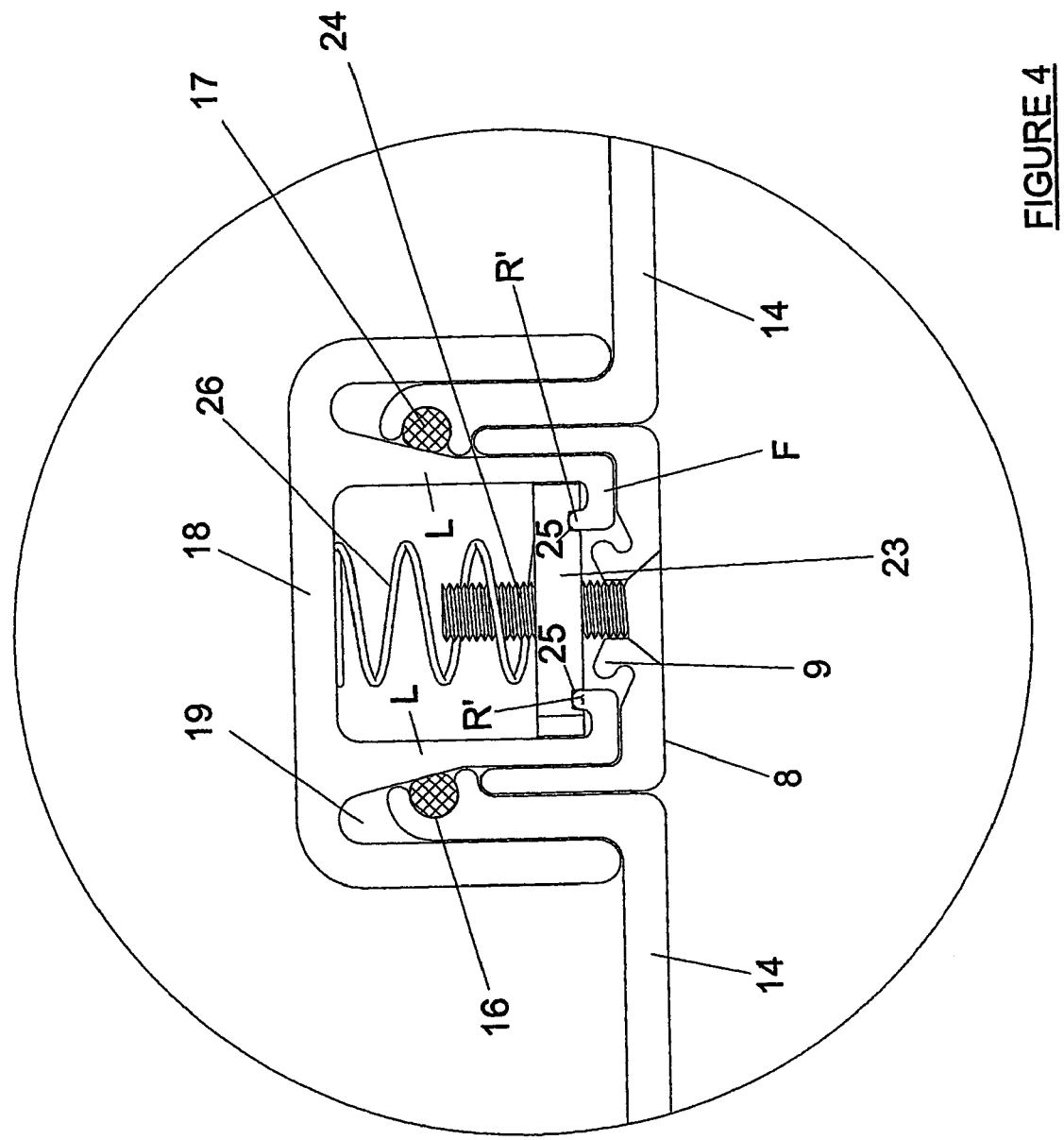
FIG. 4 illustrates the installation of a blind fixing in the structural coupling of FIG. 2.
Figure 5:
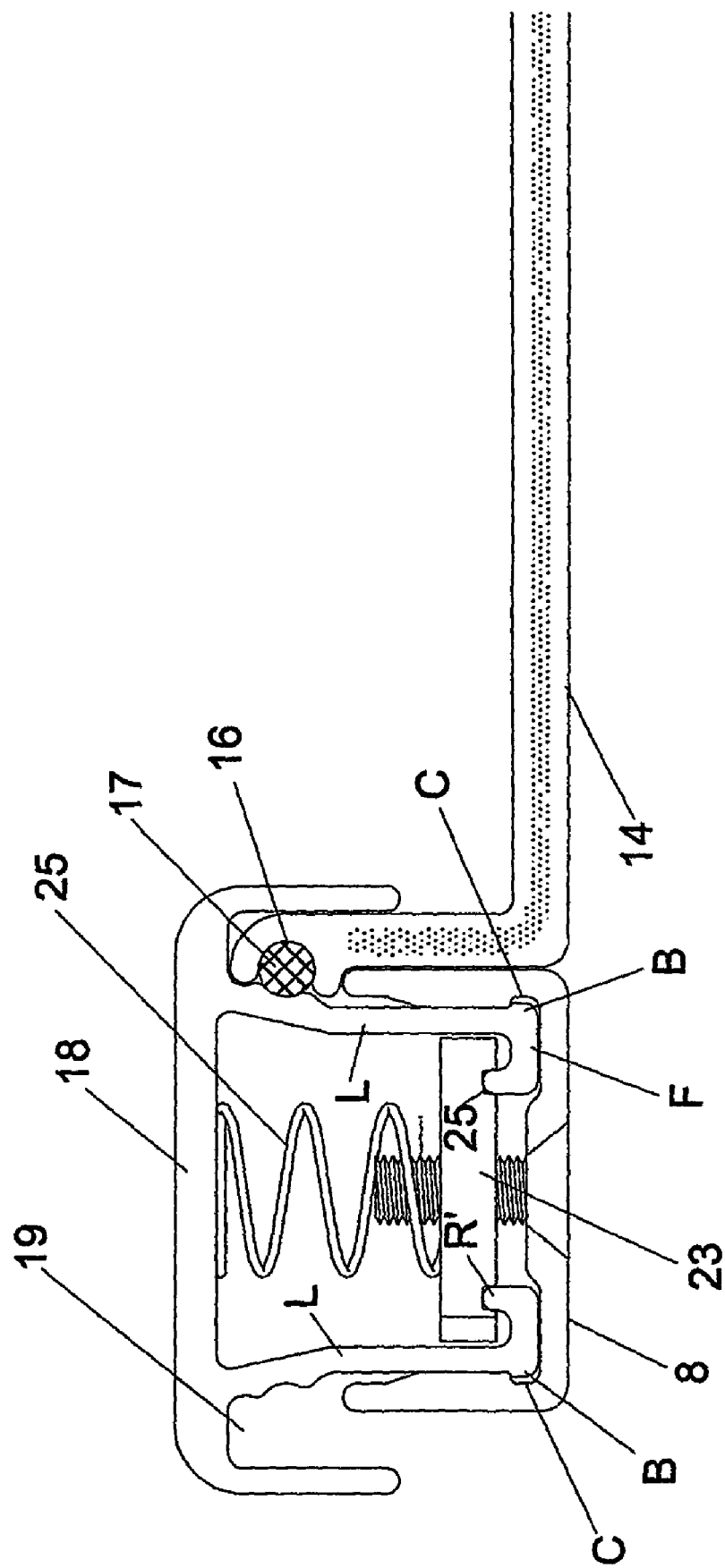
FIG. 5 illustrates an alternative form of a snap fit engagement of the channel section with a double walled channel of the wall strut assembly.

FIG. 5 shows a similar arrangement to FIG. 4 but with components modified to provide an alternative form of snap fit engagement of the channel section 8 with a double walled channel 18 of the wall strut assembly, to that of the snap fit fixing 12 of the FIGS. 1, 2 and 3 embodiments.

In this embodiment the leg formations L are flexibly formed by a pultrusion process and provided with bulbous formations B on the lower corners of the locking flanges F.

Complementary formations C are provided along the bottom corners of the channel section 8.

The leg formations L are spaced apart such that they yield inwardly when introduced to the channel section 8 and snap outwardly when the bulbous formations B encounter the complimentary formations C to snap fit into position.

This alternative form of snap fit engagement of the channel section 8 with a particular structural component is equally applicable for use with the arrangements shown in the FIGS. 1 and 3 embodiments disclosed herein, as the reader will readily understand.

In all embodiments as described it will be observed that each structural coupling employs the use of a common channel section 8 which respectively produces an elegant and non-limiting method of joining structural components together than in a direct fashion as with the Unistrut system.

This is clearly shown in FIG. 1 where the common channel section 8 is used to produce a floor panel with a flat continuous surface across the join to which blind fixings can be made, and in FIG. 2 where it is used to close the channel form of another profile thereby to entrap a third profile to make a continuous wall with reinforcing struts at every join and to which blind fixings can be made.

Finally the common channel section 8 can be used to close an open profile 21 as shown in FIG. 3, and can be formed around an inner profile 16 to form joins in a hand rail.

The constructions as described herein are preferably made by pultrusion.

Pultrusion is a process using machines to produce fibre reinforced polymer profiles. They are lighter and corrosion resistant but more flexible than steel.

Pultrusion profiles have developed a market by imitating steel profiles and offer a range of standard flats, angles, channels, I beams and tubes.

Custom variations include floor and wall panels that provide continuity by overlapping adjacent panels or by using an integral tongue and grooved joint.

Cutting and joining square tubed profiles have produced handrails but these lack the variety produced by bending and welding steel. Pultrusions cannot be welded and connections tend to be made using nuts and bolts blind rivets or adhesives.

With the present invention these deficiencies in pultrusion processing are overcome using the common channel section connector 8 as described with reference to the preferred embodiments described herein.

The invention claimed is:

1. A structural coupling device coupling together structures containing opposing, coupling leg formations provided at their end portions, said device comprising:
   a wall strut constructed to define coupling slots adapted to accommodate the coupling leg formations;
   a separate channel section containing leg portions which extend into said coupling slots for engagement with the coupling leg formations; and
   a snap fitting element operatively and directly engaging said wall strut and said channel section, whereby the coupling leg formations are coupled together.

2. The device of claim 1, wherein said wall strut includes outer side walls and inner leg wall formations which define said coupling slots on opposite sides of said wall strut.

3. The device of claim 2, wherein said inner leg wall formations include locking ribs, said channel section includes a projecting locking formation, and said snap fitting element is adapted to engage said locking ribs with said projecting locking formation.

4. The device of claim 3, wherein said projecting locking formation is formed on an inside surface of a channel base member which connects said leg portions.

5. The device of claim 4, wherein said projecting locking formation includes an embossment which provides channel recesses in said channel base member.

6. The device of claim 4, wherein when said leg portions of said channel section extend into said coupling slots, said channel base member and the coupled structures lie in the same plane.

7. The device of claim 5, wherein said inner leg wall formations form locking flanges which terminate in said locking ribs, and said snap fitting element is provided with flexible barbs to provide snap fit engagement between said locking ribs and said channel recesses of said channel base member.

8. The device of claim 1, wherein the end portions of said leg formations include recesses for accommodating sealing gaskets.

* * * * *